United States Patent
Heinry et al.

(10) Patent No.: US 10,883,384 B2
(45) Date of Patent: Jan. 5, 2021

(54) ARM FOR TURBOMACHINE CASING COMPRISING A BODY AND A REMOVABLE PART

(71) Applicant: SAFRAN AIRCRAFT ENGINES, Paris (FR)

(72) Inventors: Pierre Yves Heinry, Moissy-Cramayel (FR); Aline Bourdais, Moissy-Cramayel (FR); Guillaume Julien Puech, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 150 days.

(21) Appl. No.: 16/148,144

(22) Filed: Oct. 1, 2018

(65) Prior Publication Data

US 2019/0101026 A1    Apr. 4, 2019

(30) Foreign Application Priority Data

Oct. 2, 2017    (FR) ..................................... 17 59195

(51) Int. Cl.
| | |
|---|---|
| F01D 25/24 | (2006.01) |
| F02C 7/32 | (2006.01) |
| F01D 9/06 | (2006.01) |
| F01D 9/04 | (2006.01) |
| F02C 7/36 | (2006.01) |

(52) U.S. Cl.
CPC ............ *F01D 25/24* (2013.01); *F01D 9/047* (2013.01); *F01D 9/06* (2013.01); *F02C 7/32* (2013.01); *F02C 7/36* (2013.01); *F05D 2240/14* (2013.01); *F05D 2240/60* (2013.01); *F05D 2260/40* (2013.01)

(58) Field of Classification Search
CPC . F01D 9/047; F01D 9/06; F01D 9/065; F01D 25/24; F01D 5/146; F02C 7/32; F02C 7/36; F05D 2240/14; F05D 2240/60; F05D 2260/40
See application file for complete search history.

(56) References Cited

U.S. PATENT DOCUMENTS 4,566,269 A * 1/1986 Gingras .................... F02C 7/32
                                                    60/226.1
8,152,451 B2 * 4/2012 Manteiga .................. F01D 9/02
                                                    415/115

(Continued)

FOREIGN PATENT DOCUMENTS

DE    10 2009 044102 A1    6/2010
EP         1548231 A2       6/2005

OTHER PUBLICATIONS

Search Report issued in French Patent Application No. 1759195 dated May 15, 2018.

*Primary Examiner* — Brian P Wolcott
(74) *Attorney, Agent, or Firm* — Pearne & Gordon LLP

(57) ABSTRACT

In order to facilitate the disassembly of a transmission shaft in a turbomachine, an arm for turbomachine casing comprises a body provided with a recess housing a removable part which delimits a shaft housing and is capable of being inserted through a first opening of the recess by means of sliding movement of the removable part parallel to the direction of a central axis of the shaft housing, the first opening of the recess being configured for being arranged opposite an orifice within a casing outer shell ring of the turbomachine.

10 Claims, 5 Drawing Sheets

(56) References Cited

U.S. PATENT DOCUMENTS

| | | | | |
|---|---|---|---|---|
| 9,657,646 B2* | 5/2017 | Wotzak | ............... | F01D 9/041 |
| 9,771,828 B2* | 9/2017 | Karafillis | ........... | F01D 25/162 |
| 9,771,968 B2* | 9/2017 | Duchatelle | .......... | F01D 9/065 |
| 9,784,133 B2* | 10/2017 | Karafillis | ............ | F01D 25/162 |
| 9,796,264 B2* | 10/2017 | Brault | ................... | F02C 7/32 |
| 9,982,556 B2* | 5/2018 | Lepretre | ............... | F02C 7/32 |
| 2008/0159851 A1* | 7/2008 | Moniz | ................. | F01D 5/147 |
| | | | | 415/159 |
| 2019/0136715 A1* | 5/2019 | Juigne | .................. | F02C 7/06 |

* cited by examiner

ARM FOR TURBOMACHINE CASING COMPRISING A BODY AND A REMOVABLE PART

TECHNICAL FIELD

The present invention relates to the field of turbomachines for aircraft, and relates more specifically to a casing arm intended to house a secondary transmission shaft, as well as a turbomachine comprising such a casing arm, and a method for producing such casing arm.

The invention also relates to a method for disassembling a transmission shaft within a turbomachine.

PRIOR ART

In a turbomachine for aircraft, a transmission shaft generally connects a main shaft to accessory equipment such as a starter of the turbomachine, the main shaft being a shaft centred on the axis of the turbomachine and connecting a compressor arranged upstream of a combustion chamber to a turbine arranged downstream of the combustion chamber, in a well-known manner.

The transmission shaft is sometimes composed of a primary transmission shaft and a secondary transmission shaft mounted end-to-end and coupled to one another.

The secondary transmission shaft is generally housed, possibly with other ancillaries, in an arm integrated into a casing, commonly called "intermediate casing". Such a casing integrates, in certain cases, a plurality of outlet guide vanes, also called "OGVs".

The arm plays a structural role, given that it constitutes a privileged force path between the main shaft and a casing of the turbomachine.

However, it arises that a disassembly of the transmission shaft is required, in particular in order to enable access to the components or equipment situated inside a hub of the intermediate casing, for example in the proximity of means connecting the transmission shaft to the main shaft, or to enable access to a bearing guiding the transmission shaft.

Yet, such a disassembly of the transmission shaft requires a removal of the turbomachine to enable a complete disassembly of the intermediate casing, generally involving the disassembly of other modules situated upstream of the intermediate casing.

These operations have proved to be complex, long, and expensive.

DESCRIPTION OF THE INVENTION

The invention in particular aims to provide a simple, economic and effective solution to this problem.

To this end, it proposes an arm for a turbomachine casing, extending mainly along a longitudinal direction, and having a first longitudinal end provided with first attachment means configured for being attached to a casing outer shell ring, a second longitudinal end provided with second attachment means configured for being attached to a casing hub, and two aerodynamic outer surfaces connected to one another at a leading edge of the arm and intended to be bathed by a secondary turbomachine flow.

The arm further comprises a shaft housing having a central axis which extends in the longitudinal direction of the arm and which is configured to house, at least partially, a secondary turbomachine transmission shaft, and a body forming a first part of each of the two aerodynamic outer surfaces, and comprising at least a part of the first attachment means, and at least a part of the second attachment means.

According to the invention, the body comprises a recess arranged between a first part of the body situated on the leading edge side and a second part of the body situated on the other side, the recess opening in each of the two aerodynamic outer surfaces.

In addition, the recess has a first opening and a second opening which open respectively at the first longitudinal end of the arm and at the second longitudinal end of the arm.

Furthermore, the arm comprises a removable part housed in the recess so as to form a second part of each of the two aerodynamic outer surfaces.

In addition, the removable part is configured so as to be able to be inserted in the recess through the first opening by sliding movement of the removable part parallel to the direction of the central axis.

Finally, the removable part delimits at least a part of the shaft housing extending from the first longitudinal end of the arm to the second longitudinal end of the arm.

Thus, a removal of the removable part outside of the recess of the body enables to free up a space for the passage of the primary transmission shaft, and if necessary, for the passage of a bearing for guiding the latter, while enabling to keep the body of the arm contributing to the structural holding of the intermediate casing in place, as will subsequently appear more clearly.

The invention thus enables to facilitate a complete removal of the transmission shaft using the removable part without requiring disassembly of all of the above-mentioned casing.

Furthermore, the number of parts brought into play in such a removal operation remains advantageously limited.

In a preferred embodiment of the invention, the removable part fully delimits the shaft housing all around the central axis, in other words, over 360 degrees around the central axis.

Thus, one single part of the arm, namely the removable part, is involved in the sealing of the axial ends of the shaft housing.

Preferably, the removable part comprises another part of the second attachment means.

Advantageously, the body comprises all of the first attachment means.

In the preferred embodiment of the invention, the body comprises a base surrounding the first opening of the recess all around the central axis.

The base enables to ensure the continuity of the body on either side of the removable part.

In this case, the removable part preferably comprises attachment means by which it is attached on the base.

Preferably, the arm further comprises a kit for the passing of ancillaries, said kit being attached on the second part of the body and said kit forming a trailing edge of the arm.

The invention also relates to a turbomachine for an aircraft, comprising:

a main shaft connecting a compressor rotor to a turbine rotor, a primary flow channel which passes through the compressor rotor and the turbine rotor, a casing comprising a casing hub arranged radially outwards from the primary flow channel, and a casing outer shell ring arranged radially outwards from the casing hub, the casing hub and the casing outer shell ring defining a secondary flow channel, a transmission shaft formed from a primary transmission shaft and a secondary transmission shaft arranged end-to-end and extending along an orthogonal or tilted direction with respect to the main shaft, and wherein:

the casing outer shell ring comprises an orifice, the casing comprises an arm of the type defined above, of which the first attachment means are attached to the casing outer shell ring and the second attachment means are attached to the casing hub, such that the orifice of the casing outer shell ring is opposite the shaft housing, the primary transmission shaft has a radially internal end coupled to the main shaft, and a radially external end, the secondary transmission shaft has a radially internal end coupled to the radially external end of the primary transmission shaft, the secondary transmission shaft is housed at least partially in the shaft housing of the arm, and the removable part is shaped to be able to be inserted through the orifice of the casing outer shell ring.

The invention further relates to a method for producing an arm of the type defined above, comprising steps of:

providing an arm for a turbomachine cashing, said arm comprising a body, providing a rod, forming the recess in the body of the arm, machining the rod so as to form the removable part, mounting the removable part in the recess of the body, then machining two flanks of the removable part respectively configured to form part of the two aerodynamic outer surfaces of the arm.

This method enables, in particular, to optimise the regularity of each of the two aerodynamic outer surfaces, because each of these surfaces is formed by means of a machining operation covering both the corresponding parts of the body and of the removable part.

The invention finally relates to a method for disassembling the transmission shaft of a turbomachine of the type defined above, comprising steps of:

removing the secondary transmission shaft through the orifice of the casing outer shell ring, then removing the removable part through the orifice of the casing outer shell ring, whereas the body of the arm remains attached to the casing outer shell ring and to the casing hub, then removing the primary transmission shaft through the recess of the body of the arm, then through the orifice of the casing outer shell ring.

BRIEF DESCRIPTION OF THE DRAWINGS

The invention will be best understood, and other details, advantages and characteristics of it will appear upon reading the following description made as a non-limiting example and in reference to the appended drawings, wherein.

In all of these figures, identical references can mean identical or similar elements.

DETAILED DESCRIPTION OF PREFERRED EMBODIMENTS

Figure 1:
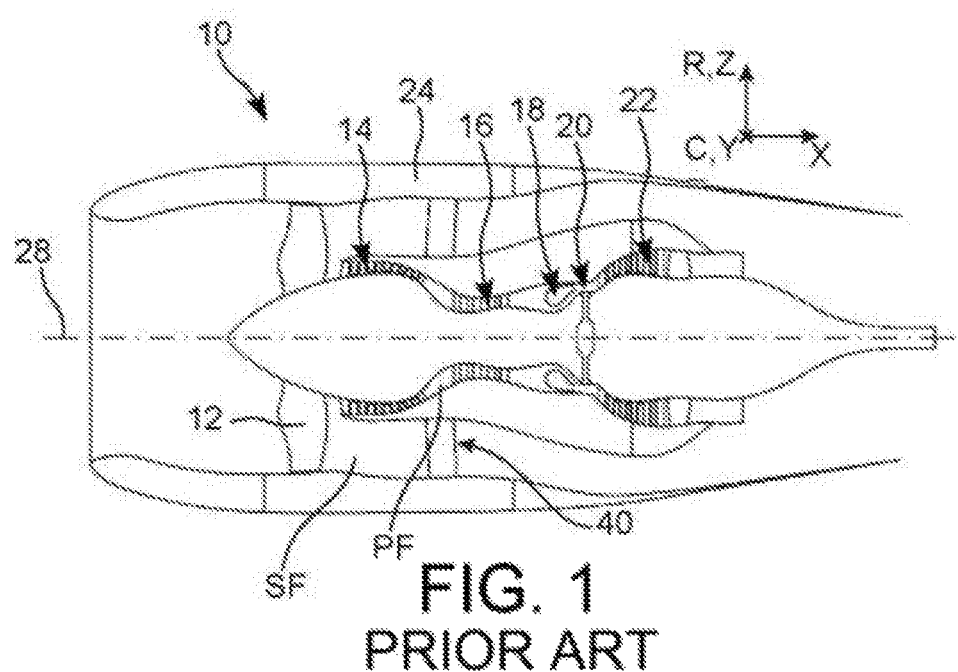
FIG. 1 is a schematic, axial, cross-sectional view of a turbomachine of a known type.

FIG. 1 illustrates a double-flow twin-spool turbomachine 10 for aircraft of a known type, generally comprising a fan 12 intended for the suction of an air flow being split downstream of the fan into a primary flow circulating in a primary flow channel, hereinafter called primary vein PF, within a core of the turbomachine, and a secondary flow bypassing this core in a secondary flow channel, hereinafter called secondary vein SF.

The core of such turbomachine comprises, generally, a low-pressure compressor 14, a high-pressure compressor 16, a combustion chamber 18, a high-pressure turbine 20 and a low-pressure turbine 22.

The respective rotors of the high-pressure compressor and of the high-pressure turbine are connected by a shaft called "high-pressure shaft", whereas the respective rotors of the low-pressure compressor and of the low-pressure turbine are connected by a shaft called "low-pressure shaft", in a well-known manner. In the terminology of the present invention, each of these shafts constitutes a main shaft of the turbomachine.

The turbomachine is streamlined by a nacelle 24 surrounding the secondary vein SF. Moreover, the rotors of the turbomachine are mounted rotating around an axis 28 of the turbomachine.

In all of this description, the axial direction X is the direction of the axis 28, the vertical direction Z is a direction orthogonal to the axial direction X and oriented vertically when the turbomachine equips an aircraft parked on the ground, and the transverse direction Y is orthogonal to the two preceding directions. Moreover, the radial direction R and the circumferential direction C are defined by reference to the axis 28, whereas the "upstream" and "downstream" directions are defined by reference to the general flowing of gases into the turbomachine.

Figure 2:
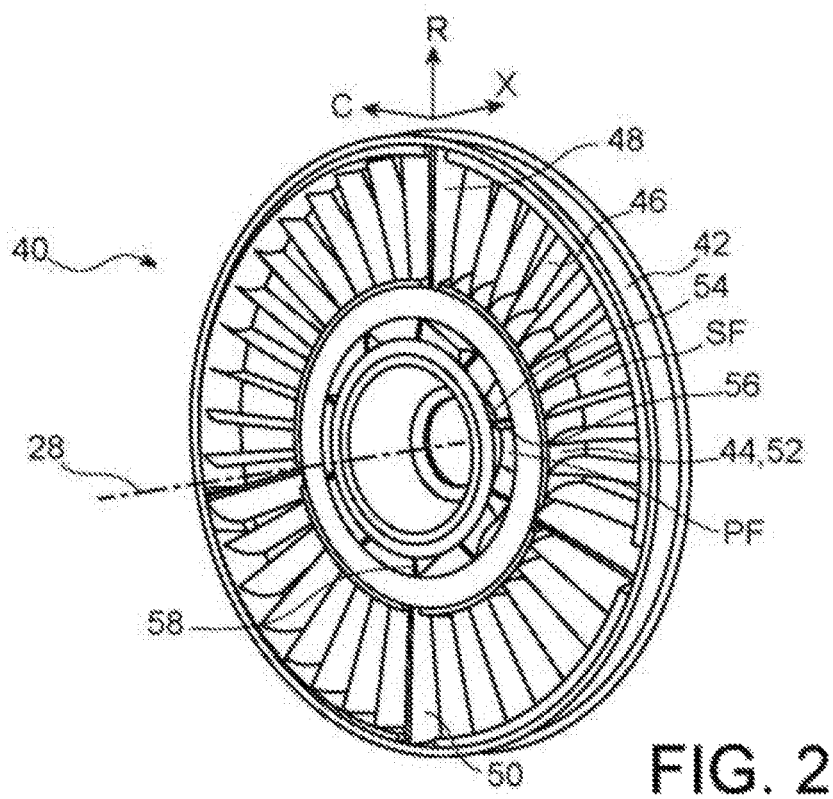
FIG. 2 is a schematic, perspective view of an intermediate casing of the turbomachine in FIG. 1, represented isolated.

The turbomachine comprises an intermediate casing 40 arranged axially between the low-pressure compressor 14 and the high-pressure compressor 16, and represented isolated in FIG. 2.

This intermediate casing 40 comprises a casing outer shell ring 42, a casing hub 44, guide vanes 46 extending from the outer shell ring 42 to the hub 44, as well as two arms 48 and 50 radially connecting the outer shell ring 42 to the hub 44 and playing a structural role. The outer shell ring 42 extends around the secondary vein SF, whereas the hub 44 extends radially inside the secondary vein SF, and radially outwards from the primary vein PF.

The casing hub 44 includes an outer annular hub wall 52, an inner annular hub wall 54, and other arms 56 connecting the outer annular hub wall 52 to the inner annular hub wall 54.

Figure 3:
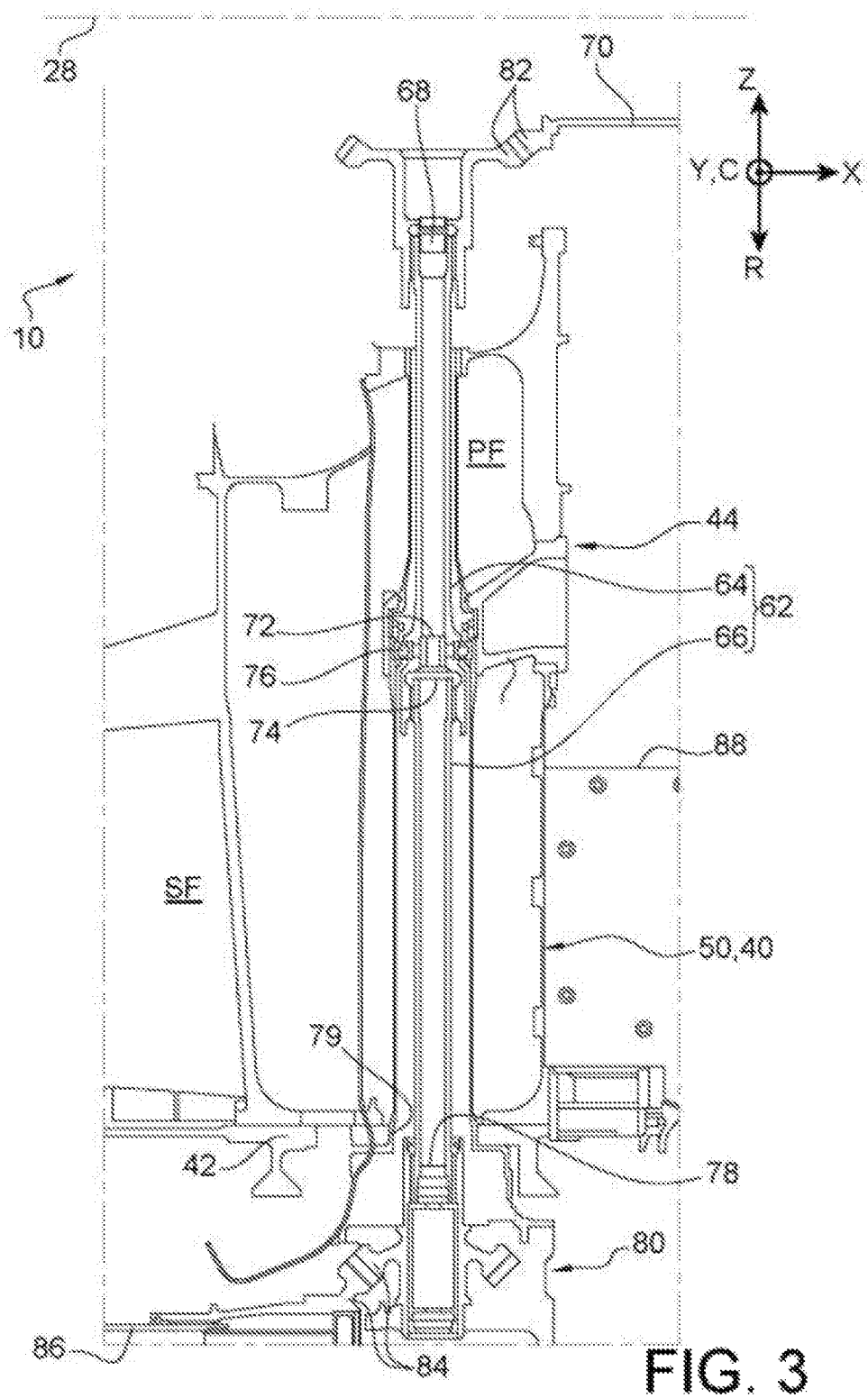
FIG. 3 is a schematic, partial, axial, cross-sectional half-view, and a half-view of a greater scale, of the turbomachine in FIG. 1, illustrating the casing in FIG. 2.

The arms 50 and 58 situated in a low position, in other words, at "six o'clock", are used for the passage of a transmission shaft 62 which can be seen in FIG. 3, and can further enable to house other ancillaries.

The transmission shaft 62 is a two-part shaft mounted end-to-end, namely a radially internal part 64, called "primary transmission shaft", and a radially external part 66, called "secondary transmission shaft".

Generally, the transmission shaft 62 is provided to transmit a rotation movement between a main shaft of the turbomachine, in general the high-pressure shaft in the case of a twin-spool turbomachine, and an accessory gear box (or AGB) connected to accessory equipment such as a starter of the turbomachine.

As FIG. 3 shows, the primary transmission shaft 64 has a radially internal end 68 coupled to the main shaft 70, and a radially external end 72. The secondary transmission shaft 66 has a radially internal end 74 coupled to the radially external end 72 of the primary transmission shaft 64 at a bearing 76 which thus ensures the guiding and the centring of the transmission shaft 62. The secondary transmission shaft 66 has a radially external end 78, which extends through an orifice 79 of the casing outer shell ring 42, and which is, for example, coupled to a bevel gearbox 80, sometimes called TGB (transfer gear box), itself connected to the accessory gear box AGB. The coupling of the radially internal end 68 to the main shaft 70 is, for example, achieved by means of a pair of bevel gears 82. The bevel gearbox 80 also comprises a pair of bevel gears 84 connecting the secondary shaft 66 to a intermediate shaft 86 itself connected to the accessory gear box AGB.

In the example illustrated, the primary 64 and secondary 66 transmission shafts extend orthogonally to the axis 28 of the turbomachine and therefore to the main shafts of it. In a variant, the shafts 64 and 66 can extend along a tilted direction with respect to the axis 28.

In addition, a kit 88 for the passing of ancillaries, sometimes called "kit engine", is attached on a body of the arm 50 so as to form a downstream end part of the arm 50.

Figure 4:
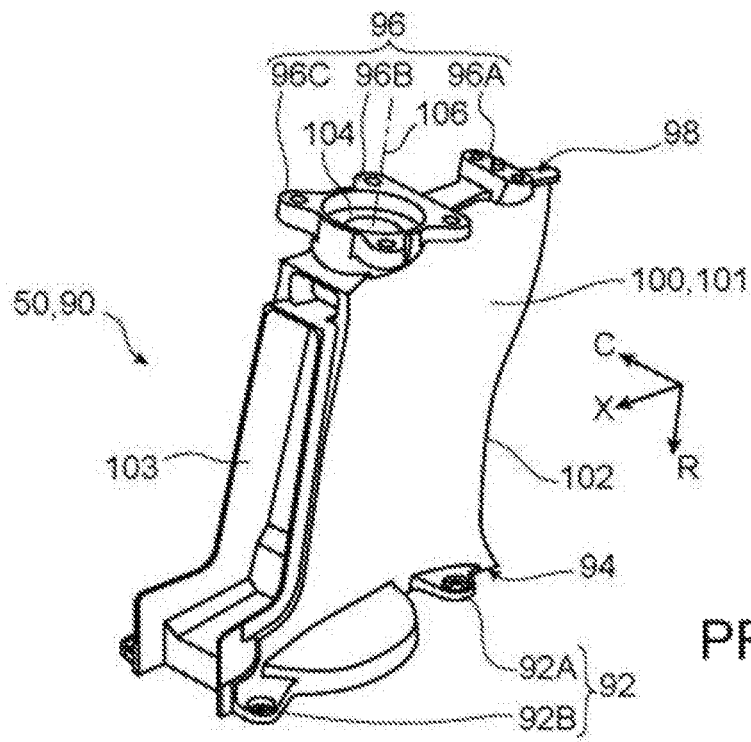
FIG. 4 is a schematic, partially perspective view of an arm belonging to the casing in FIG. 2.

FIG. 4 illustrates the body 90 of the arm 50, isolated from the remainder of the turbomachine.

This body 90 comprises first attachment means 92 arranged at a first longitudinal end 94 of the arm 50 and configured for being attached to the casing outer shell ring 42, and second attachment means 96 arranged at a second longitudinal end 98 of the arm and configured for being attached to the casing hub 44. As an example, the first attachment means 92 comprise first 92A and second 92B attachment lugs configured for being attached, for example by bolting, on complementary lugs integral with the casing outer shell ring 92, whereas the second attachment means 96 comprise third 96A, fourth 96B and fifth 96C attachment lugs configured for being attached, for example by bolting, on complementary lugs integral with the casing hub 44. The first longitudinal end 94 of the arm 50 forms a radially external end thereof and the second longitudinal end 98 of the arm 50 forms a radially internal end thereof, when the arm 50 is mounted in the turbomachine.

The body 90 has two flanks 100 (one of which is hidden in FIG. 4) which respectively form parts of two aerodynamic outer surfaces 101 of the arm connected to each other at a leading edge 102 of the arm and at a trailing edge of the arm (non-visible in FIG. 4, and generally formed by an aerodynamic envelope of the kit 88 for the passing of ancillaries). The aerodynamic outer surfaces 101 are intended to be bathed by the secondary flow within the turbomachine, in a well-known manner.

Furthermore, the body 90 comprises an attachment plate 103, on which is attached the kit 88 for the passing of ancillaries (which is not visible in FIG. 4 for more clarity).

Moreover, the body 90 integrates a shaft housing 104 having a central axis 106, which defines the longitudinal direction of the arm in the terminology of the present invention. This shaft housing 104 opens at the first and second longitudinal ends 94, 98 of the arm. This shaft housing 104 is intended to house at least partially the secondary transmission shaft 66, such that the latter is centred with respect to the central axis 106. It must be understood, by "at least partially", the fact that one or the two shaft ends can possibly extend beyond the secondary transmission shaft housing 66. In other words, the shaft housing 104 is configured to house at least a median section of the secondary transmission shaft 66.

As explained above, when the transmission shaft must be disassembled, for example in view of enabling access to elements located inwards from the casing hub 44, the arm 50 must itself be disassembled, which involves the disassembly of all of the intermediate casing and of modules arranged upstream thereof, in general involving the removal of the turbomachine.

Figure 5:
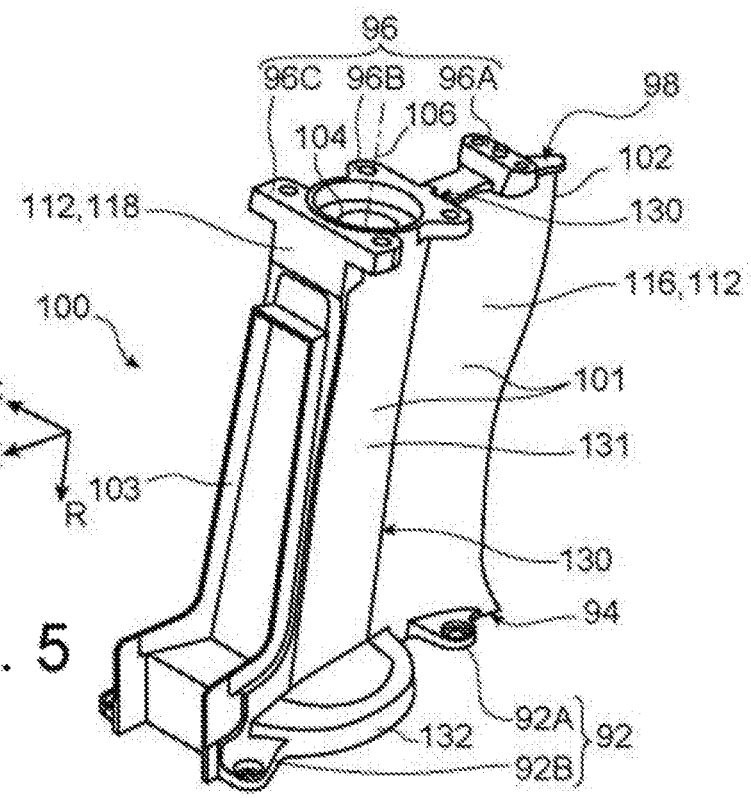
FIG. 5 is a view similar to FIG. 4, partially illustrating an arm according to a preferred embodiment of the invention intended to be substituted for the arm in FIG. 4.
Figure 6:
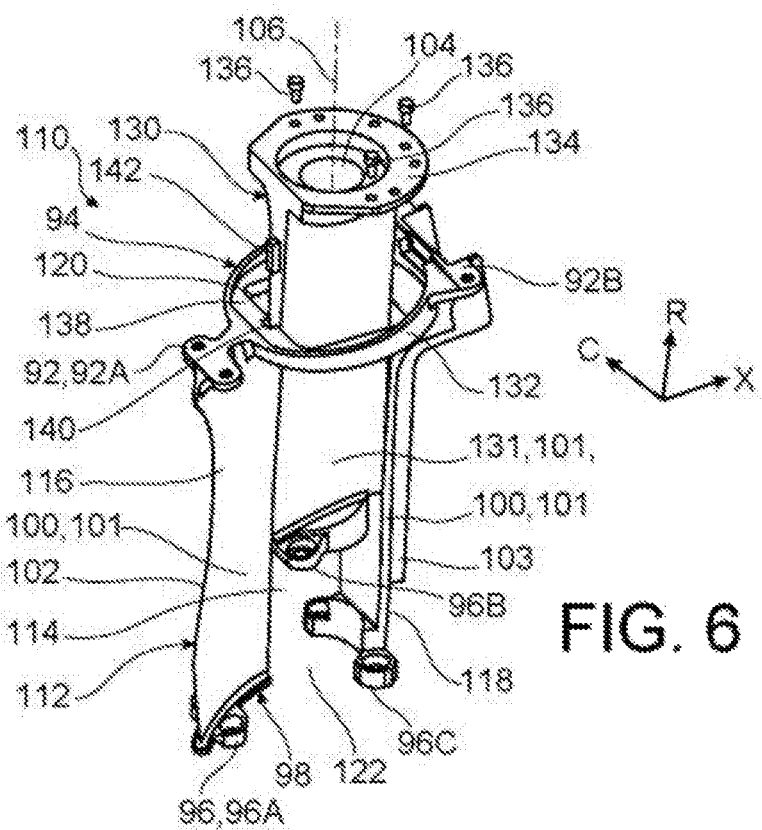
FIG. 6 is a schematic, partially perspective view along another orientation of the arm in FIG. 5, illustrating it in a disassembled state.

FIGS. 5 and 6 partially illustrate an arm 110 according to a preferred embodiment of the invention, intended to be substituted for the arm 50 in FIGS. 2 to 4 within the turbomachine in FIG. 1, in order to overcome the problem outlined above.

In the preferred embodiment of the invention, the arm 110 has an overall shape identical to that of the arm 50 defined above.

According to a particularity of the invention, the body 112 of the arm comprises a recess 114 (FIG. 6) arranged between a first part 116 of the body arranged on a same side as the leading edge 102 and a second part 118 of the body arranged on an opposite side, in other words, the side of the trailing edge.

In addition, the recess 114 has a first opening 120 and a second opening 122 respectively opening at the first longitudinal end 94 of the arm and at the second longitudinal end 98 of the arm.

Furthermore, the arm 110 comprises a removable part 130 housed in the recess 114 so as to partially form each of the two aerodynamic outer surfaces 101 of the arm (of which one is visible in each of the FIGS. 5 and 6). The body 112 of the arm also contributes to forming each of the two outer dynamic surfaces 101. In other words, the flanks 100 of the body 112 respectively form a first part of each of the aerodynamic surfaces 101, and the removable part 130 has two flanks 131 which form an aerodynamic continuity respectively with the flanks 100 of the body 112 so as to form respectively a second part of each of the aerodynamic surfaces 101. In this regard, the recess 114 opens in the flanks 100 of the body 112.

The removable part 130 is configured so as to be able to be inserted in the recess 114 through the first opening 120 of the recess (FIG. 6) by means of a sliding movement of the removable part 130 with respect to the body 112, along the direction of the central axis 106.

Finally, the removable part 130 delimits at least a part of the shaft housing 104 extending from the first longitudinal end 94 of the arm to the second longitudinal end 98 of the arm.

Thus, as illustrated in FIG. 6, the removal of the removable part 130 outside of the recess 114 enables to free up a space for the passage of the primary transmission shaft, while keeping in place the body 112 of the arm, whereby the body 112 of the arm keeps contributing to the structural holding of the intermediate casing 40, as will subsequently appear more clearly.

In the preferable example illustrated, the removable part 130 integrally delimits the shaft housing 104 over 360 degrees around the central axis 106, as FIGS. 5 and 6 show. In other words, the removable part fully surrounds the shaft housing 104. This configuration enables to maximise the space freed up by the removal of the removable part 130 outside of the recess 114.

Generally, the body 112 comprises at least a part of the first attachment means 92 and at least a part of the second attachment means 96.

In the example illustrated, the body 112 comprises all of the first attachment means 92, and part 96A, 96C of the second attachment means, whereas the removable part 130 comprises another part 96B of the second attachment means.

More specifically, as FIGS. 5 and 6 show, the first part 116 of the body comprises the first attachment lugs 92A and the third attachment lugs 96A, whereas the second part 118 of the body comprises the second attachment lugs 92B and the fifth attachment lugs 96C. Finally, the removable part comprises the fourth attachment lugs 96B, which are arranged between the third and fifth attachment lugs 96A and 96C at the level of the second longitudinal end 98 of the arm.

In addition, the second part 118 of the body comprises the attachment plate 103 to enable to attach the kit 88 for the passing of ancillaries.

Moreover, the body 112 comprises a base 132 surrounding the first opening 120 of the recess 114 all around the central axis 106 of the shaft housing 104. The base 132 thus enables to connect the first part 116 of the body to the second part 118 of it.

In addition, the removable part 130 comprises attachment means, here a flange 134, by which the removable part 130 is attached on the base 132, for example by means of screws 136 or bolts (FIG. 6).

More specifically, the base 132 advantageously has a seat 138 substantially plane, surrounding the first opening 120 of the recess, and on which is applied the flange 134 of the removable part.

The body 112 further comprises guide means to guide the removable part in the sliding movement thereof parallel to the direction of the central axis 106.

These guide means are, for example, a rail 140 in which is engaged a slide 142 formed protruding over the removable part 130.

In a variant, all of the first and second attachment means 92, 96 can be carried by the body 112, such that the removable part can be only attached on the body 112.

The arm 110 can be produced by means of a method comprising steps of:
  providing an arm for a turbomachine casing, comprising a body, which can be in one piece, such as the arm 50 in FIG. 4,
  providing a rod,
  forming the recess 114 in the body of the arm,
  machining the rod so as to form the removable part 130,
  mounting the removable part 130 in the recess 114 of the body, then
  machining the flanks 131 of the removable part, such that the flanks 131 form part of the two aerodynamic outer surfaces 101 of the arm.

Figure 7:
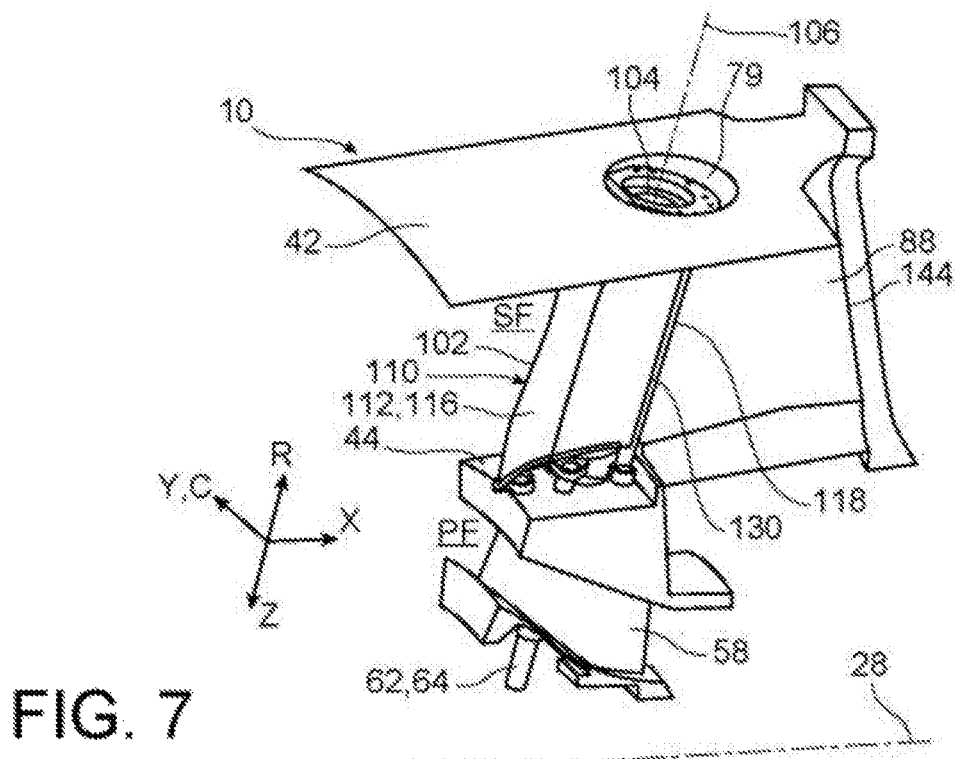
FIG. 7 is a schematic, partially perspective and axially cross-sectional view of a turbomachine equipped with the arm in FIG. 5.

FIG. 7 illustrates a part of a turbomachine, such as the turbomachine 10 in FIG. 1, in which the arm 50 in FIG. 4 has been replaced by the arm 110 in FIGS. 5 and 6. In the absence of any specification to the contrary, the above description of the turbomachine in FIG. 1 is therefore also valid for the turbomachine in FIG. 7. FIG. 7 in particular makes it possible to see the trailing edge 144 formed at the end of the kit 88 for the passing of ancillaries.

In particular, the first attachment means 92 of the arm 110 are attached to the casing outer shell ring 42 and the second attachment means 96 of the arm 110 are attached to the casing hub 44, such that the orifice 79 of the casing outer shell ring 42 faces the shaft housing 104 in which the secondary transmission shaft 66 (not visible in FIG. 7) extends.

In addition, the removable part 130 is shaped to be able to pass through the orifice 79 of the casing outer shell ring 42, as will subsequently appear more clearly.

Figure 8:
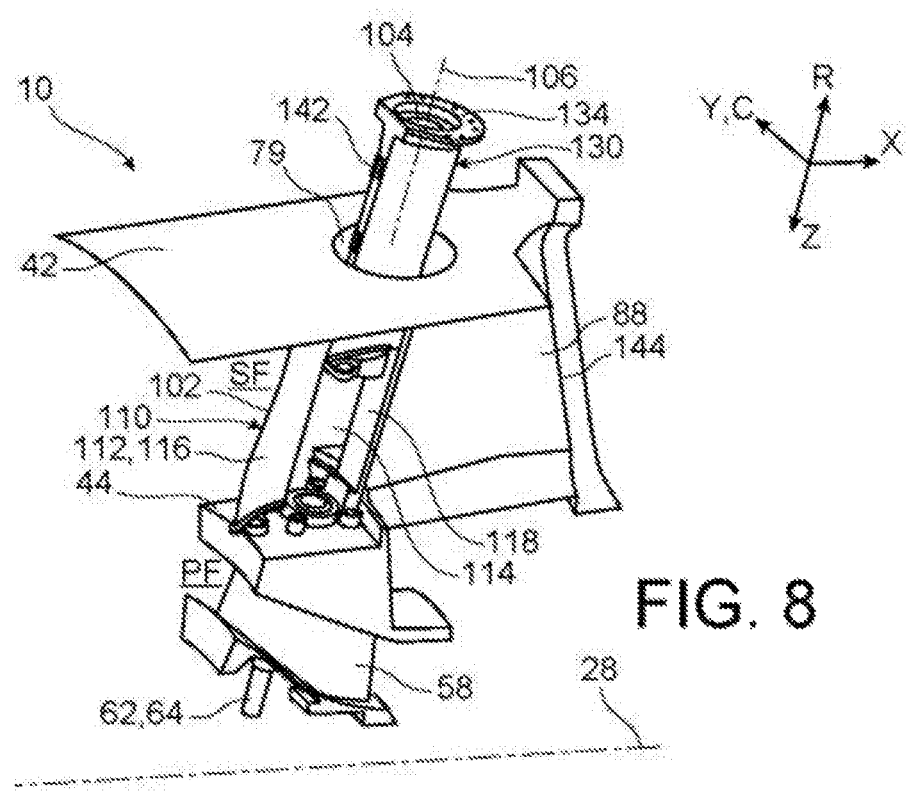
FIGS. 8 and 9 are views similar to FIG. 7, illustrating the steps of a method for disassembling a transmission shaft of the turbomachine in FIG. 7.
Figure 9:
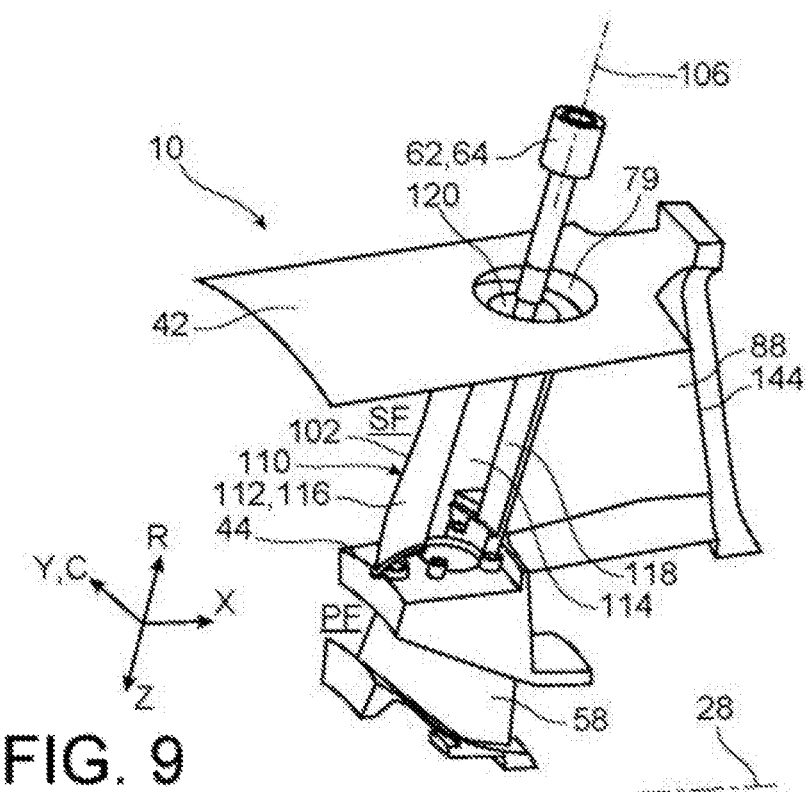

FIGS. 8 and 9 illustrate a method for disassembling the transmission shaft of the turbomachine, according to a preferred embodiment of the invention.

If necessary, the method first comprises a step of disassembling the accessory gear box (AGB) as well as the bevel gearbox 80 (TGB) (FIG. 3).

Then, the method comprises a step of removing the secondary transmission shaft 66 (visible only in FIG. 3) through the orifice 79 of the casing outer shell ring 42.

The method then comprises, if necessary, a step of detaching the removable part 130 from the body 112 of the arm 110, for example by disassembling the screws 136 connecting the flange 134 to the base 132.

The method then comprises a step of removing the removable part 130 through the orifice 79 of the casing outer shell ring 42 (FIG. 8), while the body 112 of the arm remains attached to the casing outer shell ring 42 and to the casing hub 44.

The method finally comprises a step of removing the primary transmission shaft 64 through the recess 114 of the body 112 of the arm, then through the orifice 79 of the casing outer shell ring 42 (FIG. 9).

The method can be advantageously implemented to offer simplified access to the bearing 76 supporting the transmission shaft 62 at the connection of the primary transmission shaft 64 to the secondary transmission shaft 66, for example with a view to removing this bearing.

The method also enables to free up access to an internal region of the casing hub 44, which can, for example, house temporary measuring equipment during test phases of a turbomachine before putting the same into service.

In any case, the method for disassembling the transmission shaft enables to conserve a support of the outer shell ring 42, and more generally, the intermediate casing unit 40, thanks to the holding in place of the body 112 of the arm 110, such that this method does not require disassembly of the whole intermediate casing unit 40.

The invention claimed is:

1. An arm for a turbomachine casing, the arm extending along a longitudinal direction and having:
  a first longitudinal end provided with first attachment means configured for being attached to a casing outer shell ring,
  a second longitudinal end provided with second attachment means configured for being attached to a casing hub, and
  two aerodynamic outer surfaces connected to one another at a leading edge of the arm, the arm further comprising:

a shaft housing having a central axis which extends in the longitudinal direction of the arm and which is configured to house at least partially a secondary turbomachine transmission shaft, and a body forming a first part of each of the two aerodynamic outer surfaces, and comprising at least a part of the first attachment means, and at least a part of the second attachment means, wherein:

the body comprises a recess arranged between a first part of the body situated on a leading edge side and a second part of the body situated on an opposite side, the recess leading to each of the two aerodynamic outer surfaces, the recess has a first opening and a second opening which open respectively at the first longitudinal end of the arm and at the second longitudinal end of the arm, the arm comprises a removable part housed in the recess so as to form a second part of each of the two aerodynamic outer surfaces, the removable part is configured to be inserted in the recess through the first opening by sliding movement of the removable part parallel to the longitudinal direction of the central axis, and the removable part delimits at least a part of the shaft housing extending from the first longitudinal end of the arm up to the second longitudinal end of the arm.

2. The arm according to claim 1, wherein the removable part fully delimits the shaft housing all around the central axis.

3. The arm according to claim 1, wherein the removable part comprises another part of the first and second attachment means.

4. The arm according to claim 1, wherein the body comprises all of the first attachment means.

5. The arm according to claim 1, wherein the body comprises a base surrounding the first opening of the recess all around the central axis.

6. The arm according to claim 5, wherein the removable part comprises attachment means by which the removable part is attached on the base.

7. The arm according to claim 1, further comprising a kit for passing of ancillaries attached on the second part of the body and forming a trailing edge of the arm.

8. A turbomachine for an aircraft, comprising:
a main shaft connecting a compressor rotor to a turbine rotor,
a primary flow channel which passes through the compressor rotor and the turbine rotor,
a casing comprising a casing hub arranged radially outwards from the primary flow channel, and a casing outer shell ring arranged radially outwards from the casing hub, the casing hub and the casing outer shell ring defining a secondary flow channel, and
a transmission shaft formed of a primary transmission shaft and a secondary transmission shaft arranged end-to-end and extending along an orthogonal or tilted direction with respect to the main shaft,
wherein:
the casing outer shell ring comprises an orifice,
the casing comprises an arm, the arm extending along a longitudinal direction and having:
a first longitudinal end provided with first attachment means configured for being attached to the casing outer shell ring,
a second longitudinal end provided with second attachment means configured for being attached to the casing hub, and
two aerodynamic outer surfaces connected to one another at a leading edge of the arm,
the arm further comprising:
a shaft housing having a central axis which extends in the longitudinal direction of the arm, and
a body forming a first part of each of the two aerodynamic outer surfaces, and comprising at least a part of the first attachment means, and at least a part of the second attachment means,
wherein:
the body comprises a recess arranged between a first part of the body situated on a leading edge side and a second part of the body situated on an opposite side, the recess leading to each of the two aerodynamic outer surfaces,
the recess has a first opening and a second opening which open respectively at the first longitudinal end of the arm and at the second longitudinal end of the arm,
the arm comprises a removable part housed in the recess so as to form a second part of each of the two aerodynamic outer surfaces,
the removable part is configured to be inserted in the recess through the first opening by sliding movement of the removable part parallel to the longitudinal direction of the central axis, and
the removable part delimits at least a part of the shaft housing extending from the first longitudinal end of the arm up to the second longitudinal end of the arm
of which the first attachment means are attached to the casing outer shell ring and the second attachment means are attached to the casing hub, such that the orifice of the casing outer shell ring faces the shaft housing,
the primary transmission shaft has a radially internal end coupled to the main shaft, and a radially external end,
the secondary transmission shaft has a radially internal end coupled to the radially external end of the primary transmission shaft,
the secondary transmission shaft is housed at least partially in the shaft housing of the arm, and
the removable part is shaped to be able to be inserted through the orifice of the casing outer shell ring.

9. A method for producing the arm according to claim 1, comprising steps of:
providing the arm for the turbomachine casing, comprising the body,
providing a rod,
forming the recess in the body of the arm,
machining the rod so as to form the removable part,
mounting the removable part in the recess of the body, then
machining two flanks of the removable part respectively configured to form part of the two aerodynamic outer surfaces of the arm.

10. A method for disassembling a transmission shaft of a turbomachine, the turbomachine comprising:
a main shaft connecting a compressor rotor to a turbine rotor,
a primary flow channel which passes through the compressor rotor and the turbine rotor,
a casing comprising a casing hub arranged radially outwards from the primary flow channel, and a casing outer shell ring arranged radially outwards from the casing hub, the casing hub and the casing outer shell ring defining a secondary flow channel, and the transmission shaft formed of a primary transmission shaft and a secondary transmission shaft arranged end-to-end and extending along an orthogonal or tilted direction with respect to the main shaft, wherein:

the casing outer shell ring comprises an orifice, the casing comprises an arm, the arm extending along a longitudinal direction and having:
- a first longitudinal end provided with first attachment means configured for being attached to the casing outer shell ring,
- a second longitudinal end provided with second attachment means configured for being attached to the casing hub, and
- two aerodynamic outer surfaces connected to one another at a leading edge of the arm, the arm further comprising:
- a shaft housing having a central axis which extends in the longitudinal direction of the arm, and
- a body forming a first part of each of the two aerodynamic outer surfaces, and comprising at least a part of the first attachment means, and at least a part of the second attachment means, wherein:
- the body comprises a recess arranged between a first part of the body situated on a leading edge side and a second part of the body situated on an opposite side, the recess leading to each of the two aerodynamic outer surfaces,
- the recess has a first opening and a second opening which open respectively at the first longitudinal end of the arm and at the second longitudinal end of the arm,
- the arm comprises a removable part housed in the recess so as to form a second part of each of the two aerodynamic outer surfaces,
- the removable part is configured to be inserted in the recess through the first opening by sliding movement of the removable part parallel to the longitudinal direction of the central axis, and
- the removable part delimits at least a part of the shaft housing extending from the first longitudinal end of the arm up to the second longitudinal end of the arm of which the first attachment means are attached to the casing outer shell ring and the second attachment means are attached to the casing hub, such that the orifice of the casing outer shell ring faces the shaft housing, the primary transmission shaft has a radially internal end coupled to the main shaft, and a radially external end, the secondary transmission shaft has a radially internal end coupled to the radially external end of the primary transmission shaft, the secondary transmission shaft is housed at least partially in the shaft housing of the arm, and the removable part is shaped to be able to be inserted through the orifice of the casing outer shell ring, the method comprising steps of:
- removing the secondary transmission shaft through the orifice of the casing outer shell ring, then
- removing the removable part through the orifice of the casing outer shell ring, while the body of the arm remains attached to the casing outer shell ring and to the casing hub, then
- removing the primary transmission shaft through the recess of the body of the arm, then through the orifice of the casing outer shell ring.

* * * * *